United States Patent [19]

Sakamoto

[11] 4,443,823
[45] Apr. 17, 1984

[54] CONTROLLING THE TRACE OF A ROTARY HEAD

[75] Inventor: Hitoshi Sakamoto, Zama, Japan

[73] Assignee: Sony Corporation, Tokyo, Japan

[21] Appl. No.: 317,867

[22] Filed: Nov. 3, 1981

[30] Foreign Application Priority Data

Nov. 12, 1980 [JP] Japan .................................. 55-159111

[51] Int. Cl.³ ........................ G11B 5/52; G11B 21/04
[52] U.S. Cl. .................................... 360/77; 360/10.2; 360/70
[58] Field of Search .................... 360/10.2, 70, 75, 76, 360/77, 78

[56] References Cited

U.S. PATENT DOCUMENTS 4,148,083  4/1979  Watanabe .............................. 360/77
4,149,199  4/1979  Chick et al. .......................... 360/77

Primary Examiner—George G. Stellar
Attorney, Agent, or Firm—Lewis H. Eslinger; Alvin Sinderbrand

[57] ABSTRACT

The position of a rotary head mounted on a deflection device is controlled as the head scans successive tracks on a record medium. Tracking drive signals are generated as a function of the deviation of the head relative to a track scanned thereby. The tracking drive signal is sampled at successive locations along the trace. Previously stored samples are compared to the successively produced samples, and any difference is used to correct the stored sample by a predetermined amount irrespective of the actual difference. Hence, the stored samples gradually are corrected to represent the configuration of the tracks scanned by the rotary head. When the head reproduces signals from the record medium, the generated tracking drive signals are used to control the deflection device so as to make the head coincident with the track being scanned thereby. When the head is used to record signals, the stored samples are used to control the deflection device before such samples are corrected. For recording the stored samples may be compared to reference samples, and gradually are corrected to conform to the reference samples, and used to control the deflection device so that the traces gradually conform to the configuration represented by the reference samples.

26 Claims, 9 Drawing Figures

CONTROLLING THE TRACE OF A ROTARY HEAD

BACKGROUND OF THE INVENTION

This invention relates to a method and apparatus for controlling the position of a rotary head which is mounted on a deflection device and which scans successive tracks on a record medium and, more particularly, to such a method and apparatus whereby the head is controlled to scan traces which are made to conform either to a predetermined reference during, for example, a signal recording operation, or to conform to previously recorded tracks during, for example, an edit operation.

In video signal recording/reproducing apparatus, video signals are recorded in successive, skewed tracks. Typically, the record medium upon which the video signals are recorded is a magnetic tape; and the recording/reproducing apparatus are video tape recorders (VTRs) of the so-called helical scanning type. Preferably, in order to increase the amount of information which can be recorded on a magnetic tape of fixed length and, thus, to increase the recording time of a video tape, it is advantageous to record the video signals with higher recording densities.

One proposal for increasing the recording density on magnetic tape is to record the video signals with reduced wavelength. Magnetic materials have been developed, recording and/or reproducing transducers have been manufactured, and new modulation systems have been designed so as to implement short wavelength recording of video signals. However, when recording signals with a short wavelength, a limit on the reduction of the wavelength soon is reached below which information losses rapidly increase. For example, below this limit, the signal-to-noise ratio rapidly decays in a function related to the second or third power.

An alternative technique for improving the recording density at which video signals may be recorded contemplates the recording of such signals in relatively narrow tracks having small or no guard bands therebetween. Such narrow tracks, and particularly tracks which are adjacent each other, require good control over the transducers so that the traces scanned thereby coincide with the desired tracks. An advantage in using narrow tracks is that, even as the width of the tracks is decreased, the signal-to-noise ratio decays at a much lower rate than that when shorter wavelengths are used. Typically, the S/N ratio decays relative to the width of the tracks in a function that approximates the square root.

Recently, automatic tracking systems have been proposed for controlling the scanning traces of a transducer which, for example, reproduces video signals from relatively narrow tracks. One such automatic tracking control system is described in U.S. Pat. No. 4,172,265. With this patented system, the transducer is controlled within a few microns of the track being scanned thereby, even if the track itself exhibits a distortion, or deformation, on the order of about 100 microns. That is, if the track is not perfectly linear but, in fact, bends or twists so as to be deformed from a perfectly straight track, the patented scanning control system nevertheless controls the position of the transducer so as to scan such a deformed track accurately.

In addition to the aforementioned system, other proposals have been made for controlling the scanning trace of the transducer during signal reproduction. Examples of such other proposals are found in U.S. Pat. Nos. 4,099,211 and 4,106,065.

However, in these and other tracking control arrangements, little, if any, control is effected over the transducer during recording operations. That is, although the transducer is positioned properly so as to scan previously recorded tracks, when the transducer operates to record information, there is little position control thereover. While this generally does not present a problem during normal recording, it should be avoided when the VTR operates in an edit mode, whereby new video signals are "inserted" between two segments of previously recorded signals or, alternatively, new video signals are "assembled" immediately following a segment of previously recorded signals. In particular, those signals which are recorded immediately following the edit-point, that is, those signals which are recorded immediately following the changeover of the VTR from its reproducing to its recording mode, might be recorded in tracks which are so dissimilar from the previously recorded tracks as to make continuous reproduction across the edit point difficult. For example, the previously recorded signals may be recorded in tracks which appear distorted, whereas the new, or edited, signals are recorded in tracks whose configuration appears relatively linear. This may occur if the video tape "stretches" or is otherwise distorted from the time that the previously recorded signals were recorded to the time that the new signals are recorded. Likewise, this may occur if the previously recorded signals were recorded by one VTR and the new signals are recorded by another. Also, because of changes in the operating conditions of the VTR, deformation of the tape, or other factors, the configuration of the previously recorded tracks may differ significantly from the configuration of the newly recorded tracks such that the transducer undergoes a discontinuity across the edit point.

In the foregoing examples, when the edited video tape is reproduced, the usual tracking control arrangement may be effective to conform the traces of the transducer to the configurations of the tracks on either side of the edit point; but a perceptible tracking error will be present at the edit point. This is because the transducer must scan the previously recorded tracks of one configuration and then, abruptly, must scan the newly-recorded tracks of another configuration. This perceptible tracking error is even more pronounced when tracking control systems of the so-called correlating type are used. That is, if the configuration of the newly-recorded tracks is predicted on the basis of the configuration of the previously recorded tracks, the tracking error at the edit point will be more pronounced.

OBJECTS OF THE INVENTION

Therefore, it is an object of the present invention to provide an improved method and apparatus for controlling the position of a transducer in apparatus of the aforementioned type which overcomes the aforenoted difficulties, problems and disadvantages.

Another object of this invention is to provide a method and apparatus for controlling the position of a rotary transducer mounted on a deflection device as the transducer scans successive tracks on a record medium such that, when the transducer operates in an edit mode, the aforenoted discontinuity in the tracking control of the transducer at the edit point is avoided.

A further object of this invention is to provide a method and apparatus for controlling the position of a rotary head such that the traces scanned thereby conform to previously recorded tracks during a reproducing operation, and such traces gradually are brought into conformance with a reference configuration when a transducer then is changed over to a recording operation.

An additional object of this invention is to provide a method and apparatus for producing reference control signals which are used, during a recording operation, to control the position of a rotary head so as to scan traces of a configuration which conforms to a reference configuration during a recording operation.

Yet another object of this invention is to provide a method and apparatus for controlling the position of a rotary head which scans a previously recorded track even if that track is subjected to drop-out interference.

A still further object of this invention is to provide an improved method and apparatus for obtaining data representing the configuration of tracks scanned by a rotary transducer, while maintaining such data substantially free of spurious changes that might be present either in the scanned tracks or in the actual position of the transducer relative thereto.

Various other objects, advantages and features of the present invention will become readily apparent from the ensuing detailed description, and the novel features will be particularly pointed out in the appended claims.

SUMMARY OF THE INVENTION

In accordance with this invention, a method and apparatus are provided for controlling the position of a rotary head which is mounted on a deflection device, as the head scans successive tracks on a record medium. Tracking drive signals are generated as a function of the deviation of the head relative to the track being scanned thereby, such tracking drive signals representing the configuration of a previously recorded track relative to the trace then being scanned by the head. The generated tracking drive signal is sampled at successive locations along the scanned trace, and such samples are compared to stored samples. If a difference is detected between a produced sample and a stored sample, the stored sample is corrected by a predetermined amount irrespective of the actual difference therebetween. Successive samples thus are corrected, and the corrected samples are returned to a storage device. The stored samples thus are gradually corrected to represent the configuration of the tracks being scanned by the head. During a reproducing operation, the generated tracking drive signals are used to control the position of the head. During a recording operation, reference samples, representing the configuration of a reference track, are used to control the position of the head.

The present invention finds ready application during an edit mode, wherein the head is used first to reproduce signals from previously recorded tracks, and then to record new signals. During the reproducing operation, the head is controlled so as to scan traces which coincide with the previously recorded tracks. Then, when the operation of the head changes over to record signals, the traces scanned by the head gradually are changed from the configuration of the previously recorded signals to the reference configuration. Hence, tracking discontinuities at the change-over, or edit point, are avoided.

The present invention also is used to produce the aforementioned reference samples which represent the configuration of tracks to be recorded by the head.

In a further application of this invention, when the head is used to reproduce signals from previously recorded tracks, a drop-out which may be present in such a track has little effect upon the scanning trace of the head because the stored samples which had been corrected so as to represent the configuration of such reproduced tracks are used as the tracking drive signal during such drop-out intervals.

In accordance with a preferred aspect of this invention, the stored samples which represent the configuration of the tracks being scanned by the head are adjusted, gradually, so as to conform to such track configurations. This gradual adjustment eliminates adjustments in the stored samples which otherwise might be due to spurious changes in the position of the head or spurious deformations in the track being scanned thereby.

BRIEF DESCRIPTION OF THE DRAWINGS

The following detailed description, given by way of example, will best be understood in conjunction with the accompanying drawings in which.

DETAILED DESCRIPTION OF A PREFERRED EMBODIMENT

Figure 1:
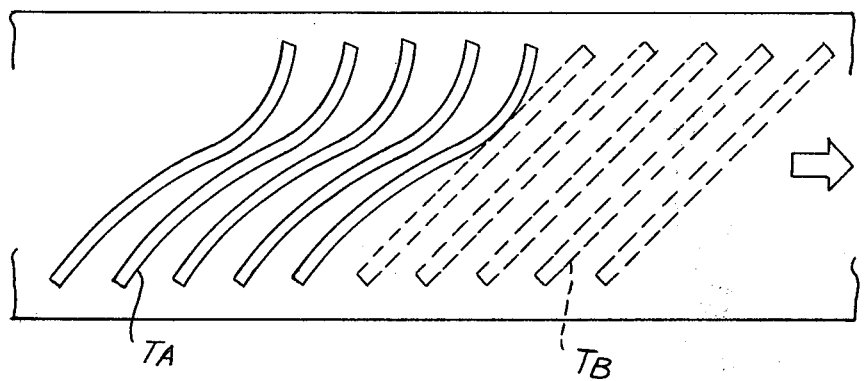
FIG. 1 represents the configurations of tracks which might be recorded during an edit operation in the absence of the present invention.

Before describing the present invention in detail, reference is made to FIG. 1 which represents the configurations of tracks which may be scanned by a recording/reproducing transducer, or head, during an edit operation. Initially, the head scans previously recorded tracks $T_A$. Although such previously recorded tracks may be deformed, or distorted, relative to an ideal track, which deformation is exaggerated in FIG. 1, the head nevertheless is controlled so that the trace scanned thereby substantially coincides with the previously recorded track. A suitable automatic head tracking system which can be used to control the head accordingly is described in aforementioned U.S. Pat. No. 4,172,265.

However, when the apparatus with which this head is used is changed over from a reproducing operation to a recording operation, as when the apparatus is operated to edit a video tape, the automatic head tracking system no longer controls the scanning trace of the head. Hence, during the recording operation, the head scans the traces illustrated by the broken lines and shown as tracks $T_B$. Ideally, these newly recorded tracks $T_B$ exhibit an ideal, linear configuration. In actuality, the newly recorded tracks $T_B$ may differ from this linear configuration. As will be appreciated, newly recorded tracks $T_B$ exhibit a configuration which is inherently formed as a function of the shape of the tape, any deformations or stretching of that tape, the speed at which the tape is transported, the rotary speed of the head, and the usual tape and head-drum servo systems which normally are provided in video tape recorders (VTRs) of the type with which such heads are used.

It is possible, as depicted in FIG. 1, for a newly-recorded track $T_B$ to intersect a previously recorded track $T_A$ at the edit, or change-over, point. Because of this, when the edited tape is reproduced, the tracks immediately following the edit point might not be traced coincidentally. Hence, a perceptible tracking error will be present at the change-over from tracks $T_A$ to tracks $T_B$, resulting in a disturbance in the video picture which is reproduced from the video signals that had been recorded in such tracks.

Figure 2:
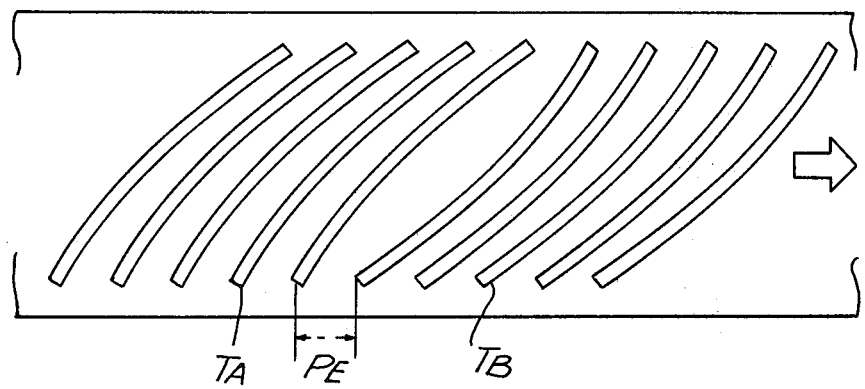
FIG. 2 is another representation of the configurations of tracks which might be recorded in the absence of the present invention.

FIG. 2 represents another arrangement wherein tracks $T_A$ and $T_B$ are recorded, by an edit operation, on a magnetic video tape. The configuration of tracks $T_A$ is seen to differ from that of tracks $T_B$. This difference in track configuration may be attributed to various factors, such as a change in the physical dimensions or properties of the magnetic tape from the time that tracks $T_A$ are recorded to the time that tracks $T_B$ are recorded. Alternatively, a change in the environmental or operating conditions may result in such different configurations. Still further, a change in the structure or circuit operations of the VTR, or the use of two different VTRs to record tracks $T_A$ and $T_B$, may result in such different configurations.

With the configurations shown in FIG. 2, tracking errors at the edit point may be minimized if the automatic head tracking system which is used to control the position of the head to reproduce the video signals recorded on the edited tape exhibits a high tracking response. However, the track pitch at the beginning of each of tracks $T_B$ commencing at the edit point may differ from the standard track pitch $P_E$. This abrupt change in track pitch from tracks $T_A$ to tracks $T_B$ is presented to the automatic head tracking system as a "step" change. Such a discontinuity in the track pitch at the beginning of the edited tracks impedes the response of the automatic head tracking system, thus producing a disturbance at the edit point in the reproduced video picture.

Figure 3:
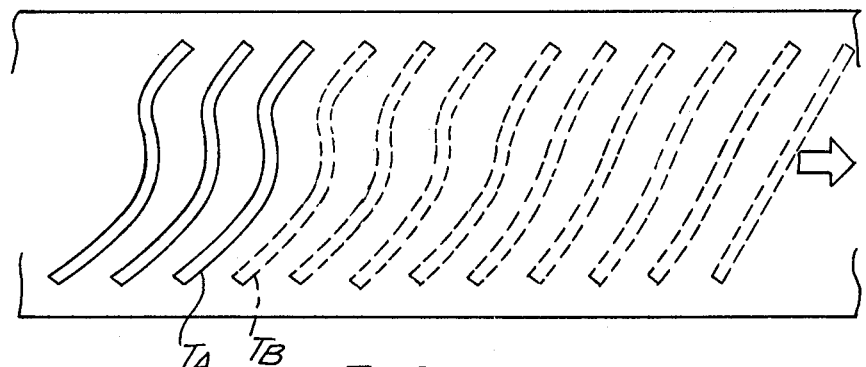
FIG. 3 represents the configurations of tracks which are recorded during an edit operation in accordance with the present invention.

FIG. 3 represents the configurations of the tracks which are recorded by the present invention. In particular, it is noted that at the edit, or change-over, point the configuration of the first of the newly-recorded tracks $T_B$ closely resembles the configuration of the last of the previously-recorded tracks $T_A$. Then, as recording of the new tracks $T_A$ continues, the configuration of the new tracks gradually is changed to coincide with a reference configuration. For convenience, the reference configuration illustrated in FIG. 3 is a substantially linear track. To use the terminology set out below, the configuration of the newly-recorded tracks $T_B$ is gradually "corrected" from the configuration of the previously recorded tracks $T_A$ to the reference configuration. As will be explained, the reference configuration is represented by reference data stored in a suitable memory; and this reference data is used to gradually correct the scanning traces of the head.

Thus, in accordance with the present invention, and as illustrated in FIG. 3, when the edited tape is reproduced, the automatic head tracking system readily follows all of the tracks, thus avoiding a tracking-error discontinuity across the edit point. Hence, perceptible disturbances in the video picture at the edit point are substantially eliminated.

Figure 4:
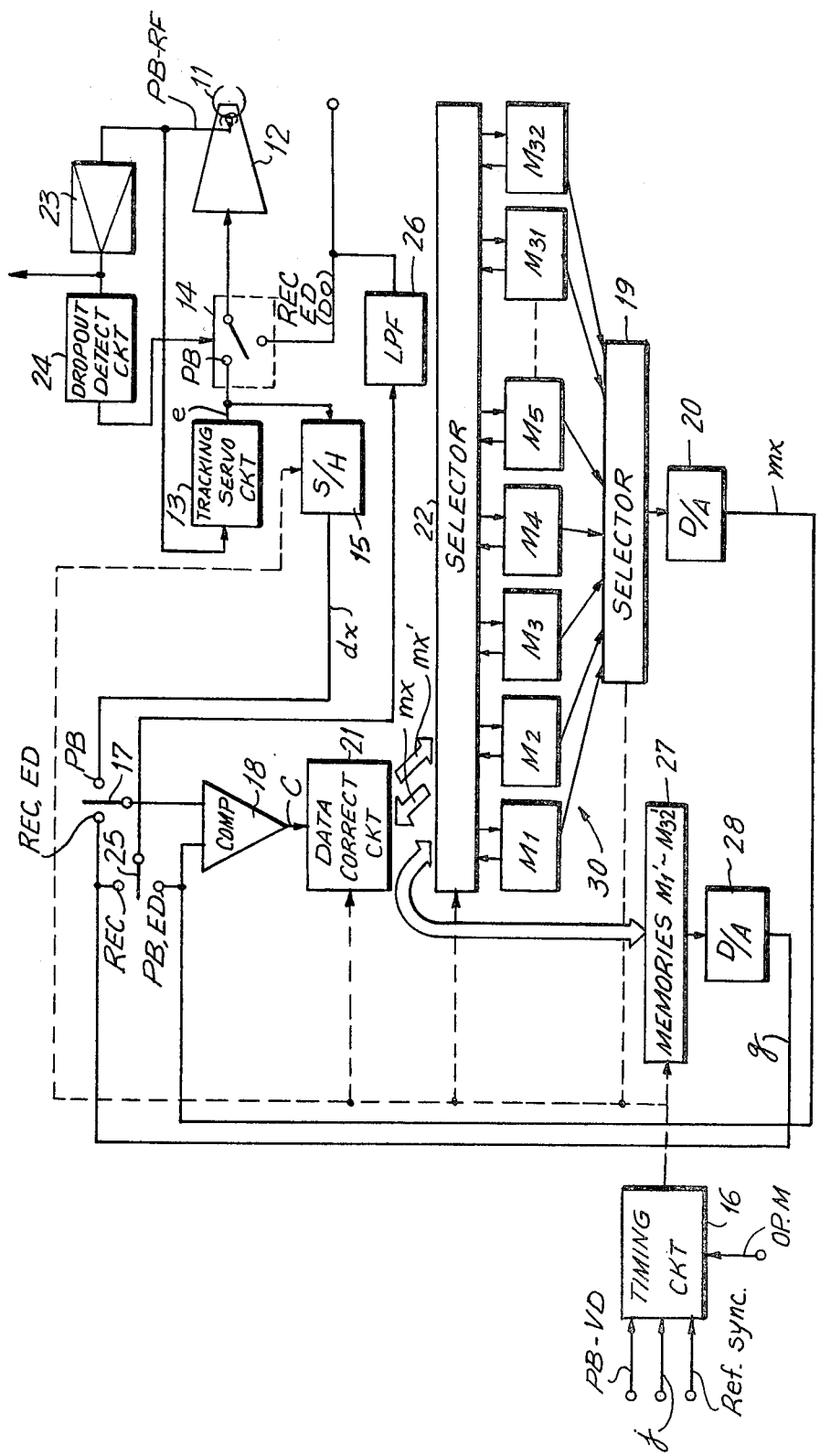
FIG. 4 is a block diagram of a preferred embodiment of the present invention.

Turning now to FIG. 4, there is illustrated a block diagram of a preferred embodiment of the present invention. A recording/reproducing transducer 11, referred to as a head, is mounted on a deflection device 12, this deflection device being mechanically coupled to, for example, a rotary portion of the usual guide drum (not shown) provided in a VTR. As this portion of the guide drum rotates, head 11 scans successive, parallel skewed tracks across a record medium, such as a magnetic tape. The magnetic tape is suitably driven in a helical path about the guide drum such that, when the VTR operates in its recording mode, video signals are recorded by head 11; and when the VTR operates in various ones of its playback modes, the recorded signals are reproduced so that a video picture derived from the reproduced video signals may be displayed.

As will be appreciated by those of ordinary skill in the art, the VTR may be operated in a so-called normal playback mode, a fast-motion motion, a slow-motion mode, a stop-motion mode, or the like. In such modes, deflection device 12 is suitably driven, as by control voltages, to deflect by appropriate amounts so as to bring head 11 into coincidence with the tracks being scanned thereby.

Although deflection device 12 may be constructed in accordance with conventional arrangements, it is preferred that this device be constructed as a bi-morph leaf comprised of two laminated plates of piezo-ceramic material. Such bi-morph leaves are known to those of ordinary skill in the art and, in the interest of brevity, further description is not provided. Nevertheless, it is understood that in response to drive voltages supplied thereto, the bi-morph leaf deflects in a direction that is substantially perpendicular to the longitudinal direction of the track being scanned by head 11.

Bi-morph leaf 12 is controlled by a tracking drive signal e generated by a tracking servo circuit 13, this tracking drive signal e being utilized by further apparatus shown in FIG. 4, for a purpose soon to be described. Tracking servo circuit 13 is provided with an input coupled to head 11 to receive the signals which are reproduced by the head as it scans a previously recorded record track of video information. The reproduced signals, identified as played back RF signals (PB-RF) also are supplied to video signal processing apparatus (not shown) via an amplifier 23. The amplified, reproduced video signals are further supplied to a dropout detecting circuit 24 which may be of conventional construction. The output of this dropout detecting circuit is coupled to a change-over switch 14 which is schematically illustrated as an electro-mechanical switch having one fixed contact PB coupled to the output of tracking servo circuit 13 and another fixed contact REC-/ED/DO which is adapted to be supplied with a tracking drive signal, as will be described below. The movable contact of change-over switch 14 selectively engages either the PB contact or the REC/ED/DO contact, and is coupled to bi-morph leaf 12 to supply a suitable tracking drive signal thereto. The bi-morph leaf deflects in a direction and by a magnitude which is determined by the polarity and amplitude of the tracking drive signal supplied thereto.

Figure 5:
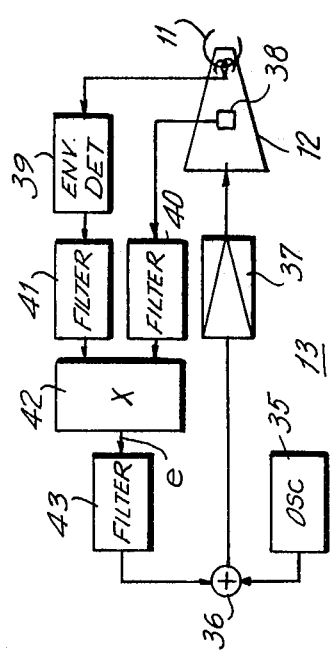
FIG. 5 is a block diagram of a tracking servo control circuit which may be used with the present invention.

Before describing the further apparatus illustrated in FIG. 4, reference is made to the block diagram of tracking servo circuit 13, shown in FIG. 5. This tracking servo circuit is similar to that shown in U.S. Pat. No. 4,172,265, and includes an oscillator 35, a strain gauge 38, an enevelope detector 39, a synchronous detector 42 and an adder 36. Oscillator 35 is adapted to generate an oscillating signal W of substantially constant frequency and amplitude, such as at a frequency which may be selected to be in the range of a few hundred Hz to several KHz. In one embodiment, the frequency of oscillating signal W is on the order of about 450 Hz. This oscillating signal is referred to herein as a "dither" signal and is supplied from the oscillator through adder 36 and an amplifier 37 to bi-morph leaf 12. It is appreciated that the bi-morph leaf oscillates, or "dithers" in response to this dither signal so as to drive head 11 from side-to-side across the track being scanned thereby.

Head 11 is coupled to envelope detector 39 which, in turn, is connected to synchronous detector 47 via a band limiting filter 41. Strain gauge 38, which may be of the type employing a resistance wire, is mounted on bi-morph leaf 12. The strain gauge exhibits a change in its resistance value in response to deflection or flexing of bi-morph leaf 12. Hence, strain gauge 38 produces a signal which represents the actual flexing or deflection of the bi-morph leaf. The strain gauge is coupled to another input of synchronous detector 42 by a band limiting filter 40. The output of synchronous detector 42 is coupled to another input of adder 36 via a still further band limiting filter 43.

In operation, let it be assumed that head 11 scans a previously recorded track having video signals recorded therein. Since oscillator 35 supplies dither signal W to bi-morph leaf 12, it is appreciated that head 11 dithers from side-to-side across the width of the track which it scans. Hence, the video signals which are reproduced by head 11 are amplitude modulated by reason of this dithering. Detector 39 detects the envelope of the amplitude-modulated video signal which, when head 11 is "centered" on the track, appears as a symmetrical envelope which varies at the dither rate of about 450 Hz. If head 11 is not "centered" on the track being scanned thereby, the envelope of the reproduced signals exhibits deviations, with the change in the magnitude of the envelope being representative of the amount of displacement of head 11 from the "center" of the track.

Regardless of the tracking error of head 11 relative to the track scanned thereby, strain gauge 38 produces a dither signal representing the actual dithering of bi-morph leaf 12. This dither signal has a frequency which is substantially equal to the frequency of the envelope that is detected by enevelope detector 39.

Filters 40 and 41 exhibit pass-bands which are centered at the dither frequency and, thus, remove unwanted frequency components which may be present in the detected envelope of the video signals and/or in the detected dithering of bi-morph leaf 12. Thus, synchronous detector 42 is supplied with the filtered envelope and the filtered dither signal, and functions to demodulate the amplitude modulation which may be present in the envelope. The resultant output signal e produced by synchronous detector 42 thus represents information as to the tracking error of head 11. That is, signal e represents the deviation of head 11 relative to the track being scanned thereby. When head 11 coincides with the track, signal e is reduced substantially to zero. This signal e is filtered by band limiting filter 43 and summed with the dither signal to be supplied as a suitable drive signal for bi-morph leaf 12. It is appreciated that, in addition to being dithered, the bi-morph leaf is controlled by filtered signal e so as to urge head 11 in coincidence with the track being scanned thereby, thus reducing signal e to a null value. The output of filter 43 is the output of tracking servo circuit 13 (FIG. 4), referred to hereinabove as the tracking drive signal.

Thus, it is appreciated that tracking drive signal e represents the configuration of the trace of head 11 relative to the track being scanned by the head. When the tracking error of the head is reduced to zero, tracking drive signal e represents that the trace scanned by head 11 coincides with the track. Hence, the tracking drive signal may be used both to represent the deviation between the trace of the head and the track, as well as the actual configuration of the trace relative to that track.

Although FIG. 5 illustrates one embodiment of tracking servo circuit 13, other embodiments thereof may be used, if desired. For example, the tracking drive signal e may be produced as a function of $(A-B)/(A+B)$, wherein A is the maximum peak of the envelope detected by envelope detector 39, and B is the minimum peak thereof. In another embodiment, pilot signals of different frequencies are recorded in respective tracks, such as during the horizontal blanking interval in each track, and the magnitudes of the pilot signals which are reproduced when a track is scanned, as well as the magnitude of cross-talk pilot signals reproduced from adjacent tracks, are compared in order to obtain the tracking drive signal. If desired, still other tracking servo circuits may be used to implement circuit 13.

Returning to FIG. 4, the additional circuit illustrated therein includes a sample-and-hold circuit 15, a comparator 18, a memory 30, and a data correction circuit 21. Sample-and-hold circuit 15 is coupled to tracking servo circuit 13 and is adapted to sample tracking drive signal e. In particular, sample-and-hold circuit 15 is supplied with sampling signals from a timing circuit 16, which sampling signals generally represent successive, discrete locations of head 11 as the head scans across the record medium. Accordingly, the sample-and-hold circuit functions to obtain samples of the tracking drive signal e at different, discrete locations along the track or trace of the head. These discrete locations are explained more fully hereinbelow with respect to FIG. 6. The output of sample-and-hold circuit 15 is selectively coupled to a comparator 18 via a change-over switch 17. This change-over switch is schematically illustrated as an electro-mechanical switch having a movable contact selectively engageable with one fixed contact PB or with another fixed contact REC, ED. Switch 17 engages fixed contact PB when the VTR with which the illustrated apparatus is used operates in its reproducing mode. When the VTR operates in its recording mode, either during normal recording or during the recording stage of an edit operation, switch 17 engages the fixed contact REC, ED.

Comparator 18 is coupled to memory 30 via a selector circuit 19 and a digital-to-analog (D/A) converter 20. Memory 30 may be a conventional solid-state memory circuit having a plurality of storage compartments therein. For convenience, memory 30 is illustrated as being formed of thirty-two storage compartments $M_1$, $M_2$, ... $M_{32}$, each being adapted to store an 8-bit digital representation of a sample of a tracking drive signal. Selector 19, which may be coupled to timing circuit 16, is adapted to select successive ones of storage compartments $M_1$, $M_2$, ... $M_{32}$ in synchronism with the successive samples of tracking drive signal e which are generated by sample-and-hold circuit 15. The output of selector circuit 19 is coupled to D/A converter 20, the latter being adapted to convert a selected 8-bit digitized sample to a corresponding analog level. The output of D/A converter 20 is coupled to comparator 18, as illustrated.

The output of comparator 18 is coupled to data correction circuit 21. This data correction circuit also is coupled to memory 30 via another selector circuit 22. This selector circuit 22 is controlled in synchronism with selector circuit 19 and is coupled to timing circuit 16. Selector circuit 22 responds to timing pulses supplied thereto by the timing circuit to selectively read out the contents of a respective one of storage compartments $M_1$ ... $M_{32}$, and to write-in a corrected sample to a selected storage compartment. Thus, selector circuit 22 may be considered a bi-directional switching circuit adapted to supply successive samples to data correction circuit 21 and to receive therefrom successive, corrected samples, which corrected samples are written into appropriate storage locations of memory 30.

FIG. 4 also illustrates a memory device 27 which is adapted to store reference samples representing the configuration of a reference track recorded on the record medium. Memory device 27 may be similar to memory 30 in that preferably it is comprised of a plurality of storage compartments $M'_1$ ... $M'_{32}$. Memory device 27 is coupled to selector circuit 22 so as to have digitized samples written into respective ones of the storage compartments during a so-called "reference recording mode". As will be explained, the digitized samples which are written into memory device 27 are read from memory 30 during this reference recording mode.

The output of memory device 27 is coupled, via digital-to-analog (D/A) converter 28 to comparator 18 via change-over switch 17. The memory device also is coupled to timing circuit 16 to receive timing signals therefrom, whereby the contents of successive storage compartments $M'_1$ ... $M'_{32}$ are read out in sequence.

Another selector switch 25, schematically illustrated as an electro-mechanical switch, is illustrated as having a movable contact coupled, via a low pass filter 26, to fixed contact REC/ED/DO of selector switch 14. Movable contact 25 is selectively engageable with a first fixed contact REC coupled to the output of D/A converter 28, and with another fixed contact PB, ED coupled to the output of D/A converter 20. When in a so-called non-edit recording mode, that is, when the VTR with which the illustrated apparatus is used operates to record signals on the record medium, switch 25 couples contact REC to low-pass filter 26. When, however, the VTR is operated in its reproducing mode or in its edit mode (the latter mode serving to reproduce or record signals during an edit operation), switch 25 couples the contact PB, ED to low pass filter 26. It will be recognized that change-over switches 14, 17 and 25 may be manually operated so as to assume their appropriate conditions in accordance with the particular operating mode that is established for the VTR.

Timing circuit 16 is adapted to generate and supply sampling pulses to sample-and-hold circuit 15, and also to supply synchronized timing pulses to selectors 19 and 22 to control write/read operations for memory 30. The timing circuit also is adapted to generate and supply synchronized control pulses to data correction circuit 21 and to memory device 27. The timing circuit thus may include conventional timing-pulse controlled flip-flop circuits, gate circuits, and the like, in order to generate the aforementioned sampling pulses and synchronized timing pulses. Timing circuit 16 includes an input terminal adapted to receive an operation mode signal OPM which represents the particular operating mode of the VTR, such as the recording mode, the reproducing mode and the editing mode. Synchronization over the operation of timing circuit 16 is determined by a synchronizing signal PB-VD, which is reproduced by the VTR during the reproducing mode, or by an external reference synchronizing signal ref sync which is generated during the recording mode. In the event of a so-called "special" reproducing mode, such as fast-motion, slow-motion or stop-motion, a head jump signal j is supplied to timing circuit 16 to control the generation of the sampling pulses and synchronized timing pulses during such special reproducing modes. The head jump signal is described in greater detail in, for example, application Ser. No 14,764, filed Feb. 24, 1979, and also is described in U.S. Pat. No. 4,203,140.

Figure 6:
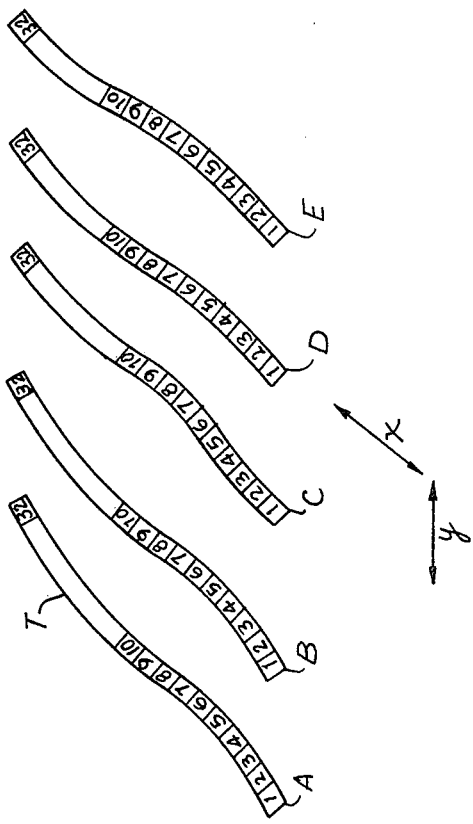
FIG. 6 represents the configurations of successive tracks which can be scanned accurately by the present invention.

Let it be assumed that the VTR with which the present invention is used operates in its reproducing mode. Accordingly, each of change-over switches 14 and 17 engages its PB contact, and change-over switch 25 engages its PB, ED contact. Head 11 scans successive tracks T, such as tracks A, B, C, D and E, shown in FIG. 6. As the head is driven past successive locations along each track, sampling pulses are generated by timing circuit 16 such that the track drive signal e generated by tracking servo circuit 13 as the head is moved is sampled at locations 1, 2, 3, ... 32 of each track. These sampling locations are schematically depicted in FIG. 6. As a numerical example, thirty-two separate samples of each tracking drive signal e are obtained as head 11 scans each trace across the record medium. As mentioned above, each sample dx (wherein x=1, 2, ... 32) generated by sample-and-hold circuit 15 is a function of the deviation of head 11 relative to a track A, B, ... E being scanned thereby; and each sample thus represents a sample of the respective configuration of such tracks. During the reproducing mode, the sampling pulses supplied to sample-and-hold circuit 15 by timing circuit 16 are synchronized with the vertical synchronizing signal PB-VD which is reproduced from the scanned tracks.

When a particular sample dx is generated, selector circuit 19 is controlled to read-out a corresponding sample mx from a respective one of storage compartments $M_1$ ... $M_{32}$. This read out sample is converted by D/A converter 20 to a corresponding analog level, and is compared in comparator 18 to the sample dx which now is generated by sample-and-hold circuit 15. In addition, selector circuit 22 is controlled to read-out the same sample mx from the same storage compartment; and selector circuit 22 supplies this read out sample to data correction circuit 21. If comparator 18 senses that the generated sample exceeds the stored sample mx read out from memory 30, the comparator produces a detection signal c which controls the data correction circuit to increase the stored sample mx by a predetermined amount. This predetermined amount is independent of the actual difference between the compared samples. Conversely, if comparator 18 senses that the generated sample dx is less than the stored sample mx, detection signal c controls data correction circuit 21 to decrease the stored sample mx by the same predetermined amount. Of course, if the generated and stored samples are equal, no change is made to the stored samples. Thereafter, selector circuit 22 writes the corrected sample mx' into a respective one of storage compartments $M_1 \ldots M_{32}$. The foregoing operation is repeated for each successive sample generated by sample-and-hold circuit 15.

In one operating mode, the storage compartment from which the previously stored sample mx is read out corresponds to the instantaneous position of head 11 along the track being scanned thereby. For example, if head 11 is at the first location illustrated in FIG. 6, sample-and-hold circuit 15 generates sample $d_1$; and selector circuits 19 and 22 select storage compartment $M_1$ from which previously stored sample $m_1$ is read out. Samples $d_1$ and $m_1$ are compared, and if any difference therebetween is detected by comparator 18, data correction circuit 21 is controlled to "correct", or change, stored sample $m_1$ by a predetermined quantity n. The corrected sample $m_1'$ then is returned, by selector circuit 22, to storage compartment $M_1$. Thereafter, as head 11 advances, sample-and-hold circuit 15 generates sample $d_2$, selector circuits 19 and 22 select storage compartment $M_2$ from which previously stored sample $m_2$ is read out; and sample $m_2$ is corrected; and the corrected sample $m_2'$ is returned to storage compartment $M_2$. In this operating mode, it will be appreciated that the samples stored in memory 30 approximate the configuration of the track which had been scanned previously by head 11. Thus, when head 11 scans track B, stored samples $m_1, m_2 \ldots m_{32}$ are close approximations of the configuration of track A. Likewise, when head 11 scans tracks C, stored samples $m_1 \ldots m_{32}$ are close approximations of the configuration of previously scanned track B. Comparator 18 thus compares the configuration of the track now scanned by head 11 to the configuration of the track previously scanned thereby. The previously stored samples $m_1 \ldots m_{32}$ in memory 30 are corrected, to more closely represent the configuration of the track now being scanned by the head.

As mentioned above, data correction circuit 21 operates to correct a stored sample mx by a predetermined amount irrespective of the actual difference between the generated sample dx and this stored sample mx. In a preferred embodiment, this predetermined amount is equal to 1 quantizing level, whereby the storage sample mx is incremented or decremented by one least significant bit thereof. Of course, if desired, any predetermined quantity n may be used to correct, or change, the stored sample.

Figure 7:
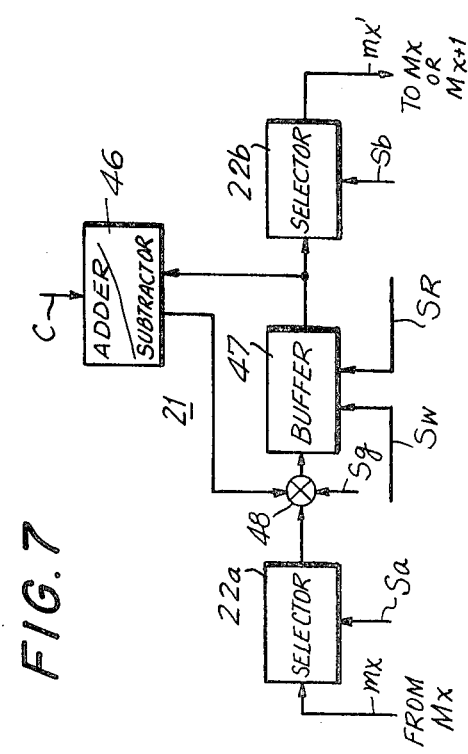
FIG. 7 is a block diagram of one embodiment of a correction circuit which may be used with the present invention.

One embodiment of data correction circuit 21 is illustrated in FIG. 7 as comprising an adder/subtractor 46, a buffer 47 and a gate circuit 48. FIG. 7 also illustrates selector circuit 22 as being comprised of a read section 22a and a write section 22b. The read section 22a of selector circuit 22 is supplied with a read pulse $S_a$; and the write section 22b of selector circuit 22 is supplied with a write pulse $S_b$. Buffer 47 also is supplied with write $S_W$ and read $S_R$ control signals which may be produced by, for example, timing circuit 16. Gate circuit 48 is supplied with a gating pulse $S_g$ which also may be produced by the timing circuit.

In operation, read pulse $S_a$ controls the read section 22a of selector circuit 22 to read the stored sample mx from storage compartment $M_x$ of memory 30. This read 8-bit sample is written into buffer 47 via gate circuit 48, which is enabled by gating pulse $S_g$, when the write control signal $S_W$ is produced. The stored sample mx in buffer 47 is read out therefrom, in response to read control signal $S_R$, to adder/subtractor 46. In the event that comparator 18 senses that the generated sample dx is more than the sample mx which has been read out of storage compartment $M_x$, detection signal c controls adder/subtracter 46 to increment the sample mx stored in buffer 47 by one bit. The incremented sample mx' is gated from adder/subtracter 46 into buffer 47 in response to the gating pulse $S_g$ supplied to gating circuit 48. This incremented, or corrected, sample mx' then is written into the buffer in response to the write control signal $S_W$. Alternatively, if comparator 18 senses that the generated sample dx is less than the sample mx which has been read out of storage compartment $M_x$, detection signal c controls adder/subtracter 46 to decrement the sample mx stored in buffer 47 by one bit. The decremented sample mx' then is gated from adder/subtracter 46 through gate circuit 48 to buffer 47. The corrected sample mx' stored in buffer 47 then is written into an appropriate storage compartment of memory 30 by the write section 22b of selector circuit 22 in response to the write pulse $S_b$. In the example described hereinabove, corrected sample mx' is written into the same storage compartment $M_x$ from which it was read. In an alternative mode of operation, as will be described below, the corrected sample mx' is returned to the next-following storage compartment $M_{x+1}$ of memory 30.

It will be appreciated that, since the stored samples mx are corrected by the predetermined amount n during each scan of head 11, abrupt changes in the trace scanned by the head, or abrupt changes in the configuration of the track being scanned thereby, do not result in correspondingly abrupt changes in the corrected samples mx'. Rather, the stored samples mx are changed gradually, such that the corrected samples mx' may be considered to be smoothed, or averaged, representations of the configuration of the tracks being scanned. This gradual correction in the stored samples mx prevents the stored samples from following spurious deflections which may occur in bi-morph leaf 12, as well as spurious distortions which may be present in the scanned tracks.

Since the VTR with which the illustrated apparatus is used now is operating in its reproducing mode, it is seen that the stored samples mx in memory 30 merely are corrected, or changed, to represent the configuration of the tracks being scanned by head 11. The actual tracking control over the head is obtained by tracking drive signal e which is produced by tracking servo circuit 13. This tracking drive signal e is supplied via change-over switch 14 to bi-morph leaf 12. Thus, the tracking servo circuit controls the bi-morph leaf such that head 11 accurately scans each track shown in FIG. 6, while memory 30 stores corrected representative samples of the configurations of such tracks.

The operation of data correction circuit 21 may be summarized as follows: if $mx > dx$, then $mx' = mx - n$. If $mx < dx$, then $mx' = mx + n$ (wherein n is a predetermined amount and, preferably, is equal to one bit). If $mx > dx$, detection signal c may be a relatively low, or negative, level so as to control adder/subtracter 46 (FIG. 7) to decrement the stored sample mx by one bit. Conversely, if mx<dx, detection signal c may be a relatively high, or positive signal so as to control the adder/subtracter to increment the sample mx by one bit. It should be appreciated that data correction circuit 21 operates in the manner described hereinabove during each sample interval, whereby each sample dx generated by sample-and-hold circuit 15 is compared to a corresponding stored sample mx read out from memory 30, and this stored sample is corrected and returned to the memory before the next sample d(x+1) is generated.

In the aforedescribed example, samples of the tracking drive signal which are generated as head 11 scans a track are compared to corresponding samples stored in memory 30, which stored samples represent the configuration of the immediately preceding track that has been scanned. Thus, and as described above, a generated sample dx is compared to a stored sample mx which is read out from storage compartment $M_x$, the stored sample then being corrected and the corrected sample mx' being returned to storage compartment $M_x$. In this mode of operation, the stored samples which represent the configuration of one track are correlated to the stored samples which represent the configuration of the next-adjacent track. That is, there is track-to-track, or inter-track, correlation. However, in some modes of operation, one of which will be described in greater detail below, the track-to-track, or inter-track, correlation is of lesser importance than the correlation between adjacent samples of the same track. This latter correlation is referred to as intra-track correlation. To obtain such intra-track correlation, a sample dx generated by sample-and-hold circuit 15 is compared to the preceding, stored sample m(x−1) read out from storage compartment $M_{x-1}$, and this preceding sample is corrected and returned as a corrected sample mx' to the next-adjacent storage compartment $M_x$. Then, the next-following generated sample d(x+1) is compared to the sample mx stored in storage compartment $M_x$, and any difference therebetween results in the correction of this stored sample which then is returned as corrected sample m(x+1)' to the next-adjacent storage compartment $M_{x+1}$. Alternatively, the same effect is obtained if the generated sample dx is compared to the sample mx stored in storage compartment $M_x$, and any difference therebetween is used to correct the sample mx, which corrected sample mx' is returned to the next-adjacent storage compartment $M_{x+1}$. In this mode, each generated sample is compared to a preceding stored, corrected sample. Thus, adjacent stored samples are corrected by the predetermined quantity n so as to establish sample-to-sample, or intra-track, correlation. Consequently, abrupt distortions or deformations in the track being scanned by head 11 from one sampled location therealong to the next, are not reflected in the samples stored in memory 30, which stored samples represent the configuration of that track.

If, during a reproducing operation, a dropout is detected in the video signals of the track being scanned by head 11, dropout detecting circuit 24 detects this dropout, and controls change-over switch 14 to connect its REC/ED/DO terminal to bi-morph leaf 12. Consequently, the tracking drive signal now supplied to the bi-morph leaf is produced by low pass filter 26 and is derived from the analog-converted, successive stored samples mx read from memory 30. It is seen that these read-out samples are supplied by D/A converter 20 to the PB, ED terminal of change-over switch 25, and thence to the low pass filter. If memory 30 stores samples representative of the configuration of the track which had just been scanned by head 11, then, if dropout is detected in the next-following track, head 11 is controlled to scan its trace to conform to the configuration of the preceding track.

When the VTR with which the illustrated apparatus is used is operating in its recording mode, change-over switch 14 engages its REC/ED/DO terminal, change-over switch 17 engages its REC/ED terminal and change-over switch 25 engages its REC terminal. It is appreciated that, during recording, head 11 does not reproduce signals from the record medium which is scanned thereby. Hence, tracking servo circuit 13 does not generate tracking drive signal e. Nevertheless, as the head scans successive traces across the record medium, the contents of successive storage compartments $M_1 \ldots M_{32}$ of memory 30 are read out by selector circuit 19, converted to corresponding analog levels by D/A converter 20, and supplied to comparator 18. At the same time, successive locations of memory device 27 are read out in response to read-out pulses generated by timing circuit 16. These successive locations in memory device 27 store "reference" samples which represent the configuration of reference tracks to be scanned, or recorded, by head 11. Such reference samples may be comprised of digital samples, such as thirty-two 8-bit samples stored at respective locations $M'_1 \ldots M'_{32}$ of the memory device. Corresponding storage compartments and storage locations of memory 30 and memory device 27, respectively, are read out concurrently. Thus, a sample stored in storage compartment $M_1$ is read out concurrently with a reference sample stored at storage location $M'_1$. Then, a sample stored in storage compartment $M_2$ is read out concurrently with a reference sample stored at memory location $M'_2$. The remaining storage compartments and memory locations are read out concurrently and successively.

D/A converter 28 converts each read out reference sample from memory device 27 to a corresponding analog level; and this reference analog sample level is supplied, by change-over switch 17, to comparator 18. Hence, during this recording operation, a stored sample read out from memory 30 is compared to a reference sample read out from memory device 27. Any difference between these compared samples is detected by comparator 18 so as to correct the stored sample which had been read out from memory 30. Thus, during the recording operation, data correction circuit 21 and selector circuit 22 operate in the same manner as described above with respect to the reproducing operation.

It will be appreciated that the reference samples stored in memory device 27 remain fixed therein. The samples stored in memory 30 are changed, or corrected, gradually so as to conform to the reference samples. Thus, regardless of the initial contents of memory 30, the samples stored therein ultimately are corrected so as to be equal to the reference samples stored in memory device 27. Thus, the stored samples in memory 30 represent the configuration of reference tracks to be scanned by head 11. As will be described below, this stored representation of a reference-track configuration is used advantageously during an edit operation.

In addition to correcting the stored samples in memory 30, the reference samples stored in memory device 27 are used to control the deflection of bi-morph leaf 12 such that head 11 scans successive traces which conform to the reference-track configuration. As illustrated in FIG. 4, successive reference samples are read out from memory device 27, converted into corresponding analog levels by D/A converter 28, and supplied to low pass filter 26 by change-over switch 25. Hence, a filtered reference tracking drive signal derived from the reference samples stored in memory device 27 is supplied to bi-morph leaf 12. Thus, the configuration of the traces scanned by head 11 conform to the reference-track configuration.

When the VTR with which the illustrated apparatus is used operates in an edit mode, head 11 first scans previously recorded tracks of a record medium to reproduce signals therefrom; and when the edit point on that medium is reached, the operation of head 11 is changed over so as to record new signals in successive tracks. As shown in FIG. 3, head 11 first scans tracks $T_A$ to reproduce signals therefrom; and then records new signals in tracks $T_B$. When the apparatus operates in its edit mode, change-over switch 14 engages its REC/ED/DO terminal and change-over switch 25 engages its PB, ED terminal. During the signal-reproducing stage of the edit mode, change-over switch 17 engages its PB terminal.

Accordingly, and as has been described hereinabove, during the reproducing stage of the edit mode, tracking servo circuit 13 produces tracking drive signal e to represent the configuration of the tracks scanned by head 11 relative to the trace scanned thereby, and these tracking drive signals are sampled by sample-and-hold circuit 15. Change-over switch 17 couples successive generated samples to comparator 18. As head 11 scans the previously recorded tracks (tracks $T_A$ in FIG. 3), selector circuit 19 reads out from memory 30 successive samples which are stored in storage compartments $M_1$ . . . $M_{32}$ in synchronism with the scanning of the head along discrete locations of the track. Concurrently, selector circuit 22 reads out the same stored samples to data correction circuit 21.

Each generated sample dx is compared to a corresponding stored sample mx in comparator 18. If the magnitudes of the compared samples differ from each other, detecting signal c controls data correction circuit 21 to increment or decrement the stored sample mx. Then, the corrected sample mx' is returned to storage compartment $M_x$ from which it was read. This operation proceeds sample-by-sample and track-to-track. Thus, it is recognized that the samples stored in memory 30 gradually are corrected so as to represent the actual configuration of the previously recorded tracks which are scanned by head 11 during the reproducing stage of the edit mode.

When the edit point along the record medium is reached, change-over switch 17 is operated to engage its REC, ED terminal. Now, corresponding memory locations of memory device 27 and storage compartments of memory 30 are read out and compared in comparator 18. That is, comparator 18 compares each stored reference sample read out sequentially from memory locations $M'_1$ . . . $M'_{32}$ to each stored sample read out sequentially from respective ones of storage compartments $M_1$ . . . $M_{32}$. Any difference between these compared samples operates data correction circuit 21 to increment or decrement the sample which had been read out from memory 30. Thus, the samples stored in memory 30 gradually are corrected to conform to the reference samples stored in memory device 27, thus conforming to the reference-track configuration. Furthermore, it is seen that change-over switch 25 supplies the samples which are read out from memory 30 to bi-morph leaf 12. Hence, as the samples stored in memory 30 are corrected, they are used to control the deflection of the bi-morph leaf so as to position head 11 to scan traces that conform to the reference track represented by the data stored in memory device 27. As shown in FIG. 3, head 11 thus is controlled to correct the configuration of tracks $T_B$, whereby the configuration of these tracks gradually is corrected from being substantially equal to the configuration of previously recorded tracks $T_A$ to being equal to the configuration of the desired reference track.

The operation of the apparatus illustrated in FIG. 4 now will be described for three distinct modes: (1) reference reproduction and recording, (2) edit and (3) drop-out reproduction.

Reference Reproducing and Recording

In this mode, reference samples representing the configuration of a reference track are obtained and stored in memory device 27. It is recalled that such reference samples are used during recording such that head 11 scans desired, or reference, tracks across the record medium. For example, the configuration of such reference tracks may be thought of as being closest to ideal linearity.

Optimally, reference tracks which are recorded by head 11 should exhibit high track-to-track (inter-track) correlation as well as high sample-to-sample (intra-track) correlation. To achieve this, one memory could be provided to store corrected samples to produce inter-track correlation, and another memory can be provided to store corrected samples to produce intra-track correlation. Of course, both memories may be combined into a single, large memory device. With such a large memory, each generated sample may be compared to the corrected version of the sample for that location which had been obtained when head 11 scanned the next preceding track, and that same sample also could be compared to the sample which had just been corrected when head 11 scanned a preceding location in the same track. Based upon both of these comparisons, the previously stored samples can be further corrected. For example, and with reference to FIG. 6, when a sample $d_{Cx}$ is generated when head 11 arrives at location x of track C, this sample is compared to stored sample $m_{Bx}$ and also to stored sample $m_{C(x-1)}$, wherein $m_{Bx}$ represents the corrected sample which had been produced when head 11 scanned location x along track B, and stored sample $m_{C(x-1)}$ represents the corrected sample which had been produced when head 11 scanned location $(x-1)$ along track C.

However, the use of such a large memory, or dual memories, to provide inter-track and intra-track comparisons is not practical and, moreover, is not necessary. In accordance with the present invention, as illustrated in FIG. 4, a single memory 30 may be used to store samples either for inter-track comparisons or intra-track comparisons. The samples stored therein will be averaged, or smoothed, either from track-to-track or from location-to-location as the head scans each track.

Figure 8:
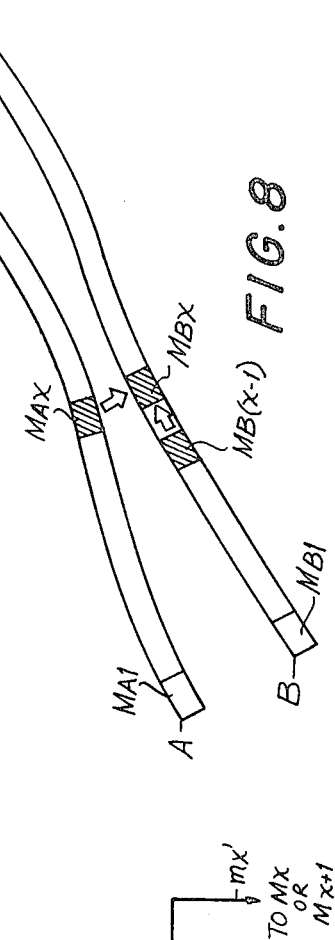
FIG. 8 represents two adjacent tracks and is useful in explaining an aspect of the present invention.

FIG. 8 is a schematic representation of the manner in which stored samples are corrected, or smoothed, to obtain either inter-track correlation or intra-track correlation. In FIG. 8, two adjacent tracks A and B are illustrated as having different configurations. For intra-track correlation, when head 11 scans location x of track B, the generated sample $d_{Bx}$ is compared to the stored sample which had been obtained and corrected when head 11 scanned the immediately preceding location $(x-1)$. Thus, sample $d_{Bx}$ is compared to the sample $m_{B(x-1)}$ stored in storage compartment $M(x-1)$, and the stored sample $m_{B(x-1)}$ is corrected and stored as corrected sample $m'_x$ in storage compartment $M_x$. Alternatively, and equivalently sample $d_{Bx}$ may be compared to the sample stored in storage compartment $M_x$, the stored sample then being corrected in the manner described hereinabove, and the corrected sample being stored in the next-following storage compartment $M(x+1)$. Thus, in its alternative operation, generated sample $d_{Bx}$ is compared to stored sample $m_{Bx}$, the stored sample then being corrected and stored as sample $m_{B(x+1)}$.

It is appreciated that the foregoing correction, or smoothing, of samples from location-to-location as head 11 scans track B is repeated for each discrete location of the head. Consequently, samples representing adjacent locations along the scanned track are corrected by the predetermined quantity n (wherein n=1 bit). Memory 30 thus accumulates averaged, or smoothed, samples which represent the configuration of the track being scanned by head 11. Abrupt changes, such as spurious distortions, in the scanned track are not reflected in the smoothed, stored samples.

It is appreciated that, when smoothed samples are accumulated in memory 30 to represent intra-track correlation, such samples are substantially independent of the samples which had been obtained during the scanning of the adjacent track. That is, the stored samples which are obtained when head 11 reaches the same relative location in each of tracks A and B may differ from each other by any arbitrary amount. Hence, the inter-track variation of such samples is not constrained as is the intra-track variation.

Advantageously, the smoothed samples which are obtained to represent the intra-track correlated configuration can be used to control the position of head 11 during a recording operation. When such data is used, it is recognized that the position of the head at one location will differ by, at most, the predetermined quantity n from the preceding location of that head. Consequently, random noise components, possible instabilities in the bi-morph leaf, transient vibrations, and the like, are smoothed during the intra-track accumulation of data and, accordingly, do not result in transient displacements of the head during recording.

It is appreciated that, when head 11 scans the initial location of track B, there is no preceding storage compartment $M_0$ from which a stored sample can be compared to the generated sample $d_{B1}$. Consequently, even when samples are accumulated in accordance with intra-track correlation, the first sample which is generated when track B is scanned is compared to the sample stored in storage compartment $M_1$, which sample had been stored when head 11 scanned the first location of adjacent track A. Thus, sample $d_{B1}$ is compared to stored sample $m_{A1}$.

It is appreciated that, when samples are accumulated in memory 30 in accordance with inter-track correlation, the sample which is obtained when head 11 scans a discrete location x along track B is compared to the stored sample which had been produced when head 11 scanned the same relative location x on the preceding track A. Thus, generated sample $d_{Bx}$ is compared to stored sample $m_{Ax}$. Any correction to the stored sample is, of course, limited to the quantity n. Therefore, although stored samples which are produced from track-to-track are constrained so as to differ from each other by a maximum of n, stored samples which are attained while scanning the same track are not subjected to such a constraint. Hence, the stored samples are smoothed from track-to-track (i. e. inter-track correlation), but are not smoothed from location-to-location within the track (i. e. intra-track correlation).

As mentioned above, when the VTR with which the present invention is used operates in its recording mode, bi-morph leaf 12 is driven by a tracking drive signal that is derived from reference samples stored in memory device 27. These reference samples are produced in accordance with the aforementioned intra-track correlation technique; and the manner in which such reference samples are produced now will be described. A reference record medium, such as a reference video tape, is prepared by recording predetermined video signals in the usual skewed tracks by a VTR of high operating accuracy and stability. The tape itself may exhibit the same mechanical and electrical characteristics which are typical of such video tapes, and, preferably, the magnetic properties thereof are typical of such tapes (e. g. by random distribution of available video tapes, the reference tape exhibits characteristics which fall within the center of such distribution). Preferably, the mechanical, or physical, properties of the reference tape are equal to, or closely approximate, designed specifications. Thus, the width, linearity, shape, smoothness, etc. of the reference tape falls within specified tolerances.

The reference tape then is loaded onto a reference VTR which operates to record reference video signals in substantially parallel, skewed tracks across the reference tape. Preferably, the operating atmosphere of the VTR is controlled so as to exhibit fixed and desired temperature, humidity and cleanliness. Preferably, the pattern or configuration of the tracks which are recorded by the VTR are examined by known optical techniques to make sure that the desired reference tracks are recorded. These tracks represent the ideal track configuration which can be recorded on video tapes by VTRs of the same general type.

After the reference tape is prepared in the aforementioned manner so as to have reference tracks recorded thereon, such tracks are reproduced by a VTR having incorporated therein the apparatus illustrated in FIG. 4. It will be appreciated that, in order to obtain reference samples for memory device 27 in each such VTR, the reference tape must be reproduced by those VTRs. In order to avoide irreversible deformation or damage to the reference tape, the number of reproducing operations which it undergoes by one or several VTRs is limited.

The reference tape is reproduced by the VTR, preferably under controlled environmental conditions. During the reproducing operation, change-over switches 14 and 17 engage their respective PB terminals and change-over switch 25 engages its PB, ED terminal. As head 11 scans successive ones of the reference tracks, tracking servo circuit 13 produces tracking drive signal e which is used to control the displacement of bi-morph leaf 12 and, thus, the position of the head. As discussed above, head 11 thus is controlled to scan traces which coincide with the successive reference tracks.

The tracking drive signal e is sampled by sample-and-hold circuit 15, and successive samples dx are compared in comparator 18 to the contents of memory 30, which contents are read out successively. It is expected that the samples stored in memory 30 initially differ significantly from the samples generated by sample-and-hold circuit 15. Accordingly, as head 11 scans successive ones of the reference tracks, the stored samples are corrected, or smoothed, gradually until the stored samples are substantially equal to the successively generated samples dx. It should be recognized that, in order to accumulate stored samples representing the configuration of the reference tracks scanned by head 11, the aforedescribed intra-track correlation technique is used. Thus, a generated sample dx is compared to a stored sample $m(x-1)$, and any difference therebetween is used to correct the stored sample, which then is stored as corrected sample mx' in storage compartment $M_x$. Alternatively, a generated sample dx is compared to a stored sample mx read out from storage compartment $M_x$, and any difference therebetween results in the correction of the stored sample which then is stored in the next-following storage compartment $M_{(x+1)}$.

It is appreciated that, after a number of successive scans by head 11, the data stored in memory 30 is indicative of the tracking drive signal which is needed to deflect bi-morph leaf 12 such that the head accurately scans the record tracks. The magnitude of this deflection is due, in large part, to the inherent mechanical characteristics of the VTR.

The reference samples stored in memory 30, which represent the configuration of the reference tracks scanned by head 11 and which are indicative of the inherent mechanical characteristics of the VTR, then are transferred to memory device 27. In the illustrated embodiment, selector circuit 22 is operated to effect this transfer. For example, the contents of successive ones of storage compartments $M_1 \ldots M_{32}$ are transferred to successive ones of memory locations $M'_1 \ldots M'_{32}$, respectively. Thus, memory device 27 is supplied with and stores the reference samples representing the configuration of the reference tracks relative to the traces scanned by head 11.

After the reference samples are stored in memory device 27, the VTR with which the present invention is used then can be operated in its recording mode so as to record video signals on a fresh video tape. In this recording mode, change-over switch 14 engages its REC-/ED/DO terminal, change-over switch 17 engages its REC, ED terminal, and change-over switch 25 engages its REC terminal. Then, as head 11 scans successive traces across the video tape, successive reference samples are read out of memory device 27, converted to corresponding analog levels by D/A converter 28, and supplied to bi-morph leaf 12 via change-over switch 25, low pass filter 26 and change-over switch 14. Hence, the bi-morph leaf is driven such that head 11 scans traces which coincide with the configuration represented by the reference samples stored in memory device 27. Also, during this recording mode, the contents of memory 30 are gradually corrected so as to be equal to the reference samples stored in memory device 27.

It should be appreciated that the smoothing operation which is used to derive the reference samples when the VTR operates in its reproducing mode to reproduce the signals from the reference video tape effectively "filters out" random or spurious errors which may be present in the configuration of the reference tracks, unexpected deformation in the reference tape or noise modulation in the deflection of bi-morph leaf 12. By eliminating such irregularities from the reference samples, head 11 is properly and accurately positioned during subsequent recording operations to record video signals in desired, substantially parallel tracks. As described above, the reference samples are obtained in accordance with the aforementioned intra-track correlation technique. However, if the configuration of one track differs drastically from the configuration of an adjacent track, thus indicating very low inter-track correlation, the aforedescribed process by which the samples stored in memory 30 are corrected during the reference reproducing operation can be modified such that each stored sample is corrected on the basis of its comparison to a sample that is generated when the head arrives at the next adjacent location along the track as well as when the head arrives at the same location while scanning the next track. That is, the stored samples may be corrected in accordance with both the inter-track and intra-track correlation techniques. Thus, memory 30 accumulates reference samples which accurately represent the configuration of the reference tracks which are scanned by head 11, and such reference samples exhibit good inter-track and intra-track correlation.

Edit Mode

The edit operation described herein may be either the so-called "assemble" edit operation or the "insert" edit operation. In both operations, new video signals are recorded in tracks immediately following previously recorded tracks of video signals. Hence, new information may be thought of as being "assembled" after old information, or new information may be thought of as being "inserted" into a segment between old information. In both edit operations, it is conventional first to reproduce the signals from the previously recorded tracks and then to record new tracks containing the new information. The changeover from reproducing to recording occurs at the edit point.

When the VTR operates in its edit mode and reproduces information from the previously recorded tracks prior to reaching the edit point, the apparatus illustrated in FIG. 4 operates in a manner similar to that described hereinabove for a normal reproducing mode. Hence, change-over switches 14 and 17 engage their respective PB terminals, and change-over switch 25 engages its PB, ED terminal. As head 11 scans the previously recorded tracks, tracking servo circuit 13 produces tracking drive signal e which is supplied to bi-morph leaf 12 to control the position of head 11. This tracking drive signal e also is sampled, and each sample dx is compared to a stored sample mx read out from a storage compartment $M_x$ of memory 30. As described above, the difference between the compared samples results in the correction of the stored sample, and this corrected sample mx' then is returned to the storage compartment $M_x$ from which it was read. Thus, as the previously recorded tracks are scanned by head 11, memory 30 accumulates samples which are gradually corrected so as to represent the actual configuration of the tracks then being scanned. Hence, when the edit point is reached, memory 30 stores data that represents the configuration of the previously recorded tracks.

At the edit point, the VTR with which the illustrated apparatus is used is changed to its record mode. Accordingly, change-over switch 14 engages its REC-/ED/DO terminal, change-over switch 17 engages its REC, ED terminal and change-over switch 25 remains engaged with its PB, ED terminal. Now, head 11 scans successive traces to record signals on the record medium. As the head scans each trace, successive samples are read out of memory 30 and successive reference samples are concurrently read out of memory device 27. These samples are compared, sample-by-sample, in comparator 18 and any difference therebetween is used to correct the sample which had been read out of memory 30. The corrected sample then is returned to the storage compartment from which it was read. Thus, the contents of memory 30 gradually are corrected to conform to the reference samples stored in memory device 27.

The samples which are read out from memory 30 in succession also are applied, via change-over switch 25, low pass filter 26 and change-over switch 14, to bimorph leaf 12. Thus, the samples which are read out of memory 30 are used as a tracking drive signal to control the position of head 11 as it scans successive traces during the recording operation. It is appreciated that, as the contents of memory 30 gradually are corrected to conform to the contents of memory device 27, the configuration of the tracks scanned by head 11 likewise are corrected gradually so as to conform to the configuration of the reference track represented by the reference samples in memory device 27. Thus, and as shown by the broken lines in FIG. 3, the new information which is recorded by head 11 is recorded in successive tracks $T_B$ whose configuration gradually is corrected from the configuration of the previously recorded tracks to the desired, reference track configuration. It is seen that the first of the newly recorded tracks exhibit substantially the same configuration as the previously recorded tracks. Then, however, the configuration of the newly recorded tracks gradually is changed to conform to the ideal, reference configuration. There is, therefore, a continuity across the edit point, as shown in FIG. 3. This continuity is achieved by correcting the samples stored in memory 30 in accordance with the aforedescribed inter-track correlation technique.

Figure 9:
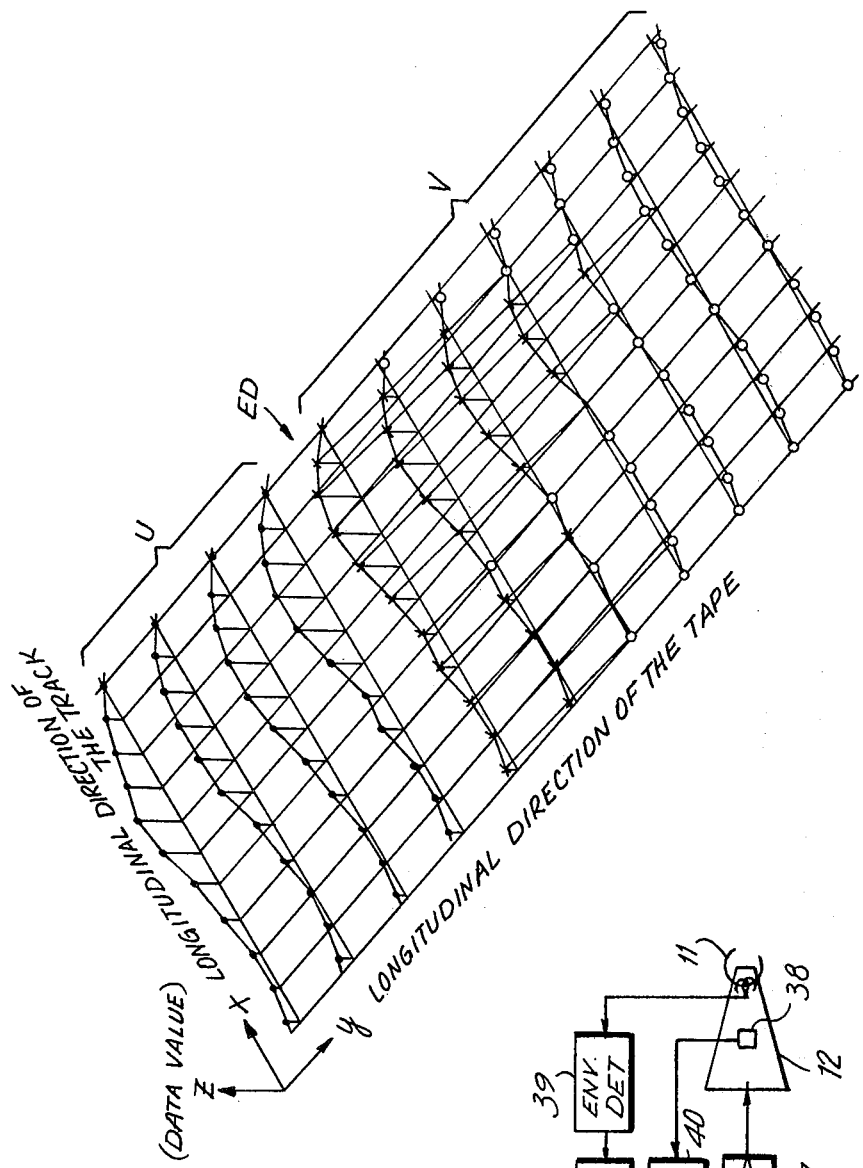
FIG. 9 is an isometric representation of the manner in which the present invention gradually adjusts the traces of a scanning head during an edit operation, in accordance with the present invention.

FIG. 9 is an isometric representation of the manner in which the samples stored in memory 30 are corrected gradually so as to gradually correct the configuration of the tracks scanned by head 11 when an edit point ED is reached. In FIG. 9, the previously recorded tracks of signals are represented by reference numeral U, and the tracks of newly recorded signals are represented by reference numeral V. In addition, the x direction is the longitudinal direction of the track, that is, the direction in which head 11 is scanned, the direction y is the longitudinal direction of the tape, that is, the track-to-track direction, and the direction z represents the analog value of the samples stored in memory 30. Furthermore, the "black" dots represent the samples stored in memory 30 when the previously recorded tracks U are scanned, the "white" dots represent the samples stored in memory 30 representing the desired values of the samples in memory 30 when head 11 traces the reference track configuration, and the cross-points represent those samples stored in memory 30 which are corrected to equal the desired sample values.

In FIG. 9, it is assumed that memory 30 stores samples that are substantially constant and which represent the configuration of the previously recorded tracks prior to edit point ED. Once this edit point is reached, each stored sample is corrected by one bit during each successive trace of head 11, until the respective samples become equal to the corresponding reference samples stored in memory device 27. It is appreciated that, as the samples stored in memory 30 are used to control the actual position of head 11, the configuration of each scanning trace of the head in region B gradually is corrected to conform to the configuration of the reference track. Since the samples stored in a respective storage compartment of memory 30 is changed by only one bit during each scanning trace of head 11, it will be appreciated that the time required for the scanning trace to conform to the configuration of the reference track will be determined by the maximum difference between a sample stored in a particular storage compartment of memory 30 and a reference sample stored in the corresponding memory location of memory 27 at the time that edit point ED is reached. In the embodiment represented in FIG. 9, this time duration is equal to the time required to scan six successive tracks.

Immediately prior to reaching edit point ED, the tracking drive signal e, as well as the samples thereof stored in memory 30, are attributed to the actual deformation of the previously recorded track which is scanned, to the inherent mechanical characteristics of the VTR and also to random or arbitrary displacements which may occur in the position of head 11. Nevertheless, these factors determine the actual scanning trace of the head. Since, at edit point ED, the trace of head 11 coincides with the track being scanned, it is desired, to maintain continuity across the edit point, to include these factors in the tracking drive signal which now will be applied to bi-morph leaf 12. Of course, once the edit point is traversed, new tracks are recorded, and such new tracks preferably should exhibit the same configuration as the desired reference track.

It may be thought that, rather than modify the configuration of the newly recorded tracks so as to conform to the reference track configuration, the new tracks can be recorded with precisely the same configuration as the previously recorded tracks. This could be attained merely by maintaining the samples stored in memory 30, without correction thereof, after the edit point ED is reached. However, it is possible that, as the VTR continues to record new tracks in the recording stage of the edit mode, the configuration of these new tracks may be deformed even if the samples stored in memory 30 remain constant and are used to control the position of head 11. This is because an inherent offset error in the tracking servo system or an offset in the recording position of head 11 or in the capstan servo system or in the tension servo system might be present as the VTR is changed over between its reproducing and recording modes. Such offset errors are cumulative if successive edit operations are carried out. Thus, during each edit operation, a very small deformation in the configuration of the newly recorded tracks may be introduced. Although each individual deformation is very small, such deformations accumulate as the number of edit operations grows. Of course, random deformations have a statistically low probability of accumulating, but inherent offset errors of the type mentioned above will accumulate so as to result in a substantial deformation of the record tracks which are recorded during succeeding edit operations. The tracking servo circuit illustrated in FIG. 5 is effective to reduce tracking errors to approximately 1% even if the configuration of the newly recorded tracks is deformed due to offset errors. Nevertheless, deformations in the track configuration may accumulate to the point that head 11, in order to follow such tracks accurately, must be displaced by an amount equal to approximately one track pitch.

In order to avoid such accumulated track deformations, and thus reduce the requisite displacement of head 11 in order to scan accurately such tracks, it is preferred to change the configuration of the newly recorded tracks following each edit point ED so as to conform to the configuration of the reference track. In this manner, offset errors do not accumulate; and when the tracks which are recorded by a number of edit operations are reproduced, the tracking control over head 11 will not run the risk of exceeding the servo control range of tracking servo system 13. Accordingly, accurate tracking control over the head will be attained even if the tracking servo system exhibits a relatively low level of response.

Drop-Out Reproduction

As mentioned above, in the event that dropout occurs in a track being reproduced by head 11, dropout detecting circuit 24 controls change-over switch 14 to change over from engagement with its PB terminal now to engage its REC/ED/DO terminal. In this condition, switch 14 couples successive samples read out of memory 30, and converted to corresponding analog levels, to bi-morph leaf 12. Consequently, head 11 is positioned to scan a trace whose configuration is substantially identical to the configuration of the trace previously scanned thereby and represented by the samples stored in memory 30. Of course, at the cessation of dropout, change-over switch 14 once again engages its PB terminal to couple the tracking drive signal e to bi-morph leaf 12. Hence, in the event of dropout, there is little disruption in the continuity of the traces scanned by head 11.

It may be appreciated that, if memory 30 had stored the actual samples of each tracking drive signal e as opposed to smoothed or corrected versions thereof, an aberration which might be present in the tracking drive signal immediately prior to dropout would be used to impart a corresponding aberration in the trace scanned by head 11 during dropout. The use of smoothed, stored samples maintains continuity between successive scans of head 11 even in the presence of dropout.

While the present invention has been particularly shown and described with reference to a preferred embodiment, it will be readily appreciated by those of ordinary skill in the art that various changes and modifications in form and details may be made without departing from the spirit and scope of the invention. For example, the quantity n by which each sample is corrected need not be limited to a single bit. That is, rather than incrementing or decrementing the least significant bit of the stored 8-bit sample, the second least significant bit may be changed accordingly. Furthermore, the reference samples stored in memory 27 may be statistically determined and generated by other apparatus so as to be the same for representative VTRs. Such reference samples then may be loaded into memory device 27 in each such VTR. Alternatively, memory device 27 may be a read only memory (ROM) or a programmable read only memory (PROM) that is prepared, or programmed, independently of the actual operation of the VTR with which it is used. It is intended that the appended claims be interpreted as including the foregoing as well as various other changes and modifications.

What is claimed is:

1. Apparatus for controlling the position of a rotary head mounted on a deflection device as said head scans successive tracks on a record medium, comprising tracking drive signal generating means for generating tracking drive signals as a function of the deviation of said head relative to a track being scanned thereby; sampling means coupled to said tracking drive signal generating means for sampling said tracking drive signals at successive locations along said track to produce successive samples as said head scans said track; storage means for storing corrected samples of tracking drive signals; comparator means coupled to said sampling means and to said storage means for comparing said successively produced samples to a stored tracking drive signal sample to detect a difference therebetween; correction means coupled to said comparator means and responsive to a detected difference for selectively correcting a tracking drive signal sample stored in said storage means by a predetermined amount irrespective of the actual difference between the produced sample and the stored tracking drive signal sample to produce a corrected sample; means for returning said corrected samples of said tracking drive signal to said storage means; and supply means for selectively supplying said generated tracking drive signals or a corrected tracking drive signal derived from said storage means to said deflection device for deflecting said head.

2. The apparatus of claim 1 wherein said supply means comprises switch means operable in a first state to supply said generated tracking drive signals to said deflection device when said head scans said record medium to reproduce signals previously recorded in tracks thereon, and operable in a second state to supply said corrected tracking drive signal to said deflection device when said head scans said record medium to record signals in tracks thereon.

3. The apparatus of claim 2 wherein said supply means further comprises drop-out detecting means for detecting a dropout in the signals reproduced from said record medium to change over said switch means from said first state to said second state.

4. The apparatus of claim 1 wherein said storage means comprises a plurality of storage compartments for storing respective ones of said corrected samples of a tracking drive signal.

5. The apparatus of claim 4 wherein said comparator means compares a sample produced when said head reaches a first location along a track to a sample stored in a respective storage compartment which had been corrected when said head reached a preceding location along said track; and wherein said means for returning returns the stored sample which is corrected by said correction means to the next-following storage compartment; whereby the corrected samples stored in said storage compartments represent a tracking drive signal averaged along said track.

6. The apparatus of claim 5 wherein each storage compartment is associated with a relative location of the track scanned by said head; and further comprising selecting means for selecting the storage compartment associated with the next-preceding location of the track scanned by said head from which the sample stored therein is applied to said comparator means, and for selecting the next adjacent storage compartment associated with the present location of the track scanned by said head to which the sample which is corrected by said correction means is stored.

7. The apparatus of claim 5 wherein each storage compartment is associated with a relative location of the track scanned by said head; and further comprising selecting means for selecting the storage compartment associated with the present location of the track scanned by said head from which the sample stored therein is applied to said comparator means, and for selecting the next adjacent storage compartment associated with the next-following location of the track scanned by said head to which the sample which is corrected by said correction means is stored.

8. The apparatus of claim 4 wherein said comparator means compares a sample produced when said head reaches a respective location along a track to a sample stored in a respective storage compartment which had been corrected when said head reached substantially the same location along the preceding track; and wherein said means for returning returns the stored sample which is corrected by said correction means to the same respective storage compartment whereby the corrected samples stored in said storage compartments represent a tracking drive signal averaged from track-to-track.

9. The apparatus of claim 4 wherein each stored sample is a digital sample; and wherein said correction means comprises means for incrementing said stored digital signal by a predetermined amount when said comparator means detects that a produced sample exceeds the stored digital signal to which it is compared and for decrementing said stored digital signal by said predetermined amount when said comparator means detects that said produced sample is less than said stored digital signal to which it is compared.

10. The apparatus of claim 9 wherein said predetermined amount is equal to ±1 bit.

11. The apparatus of claim 1 further comprising a source of reference samples representing a reference tracking drive signal; and switch means for selectively coupling said source to said comparator means in place of said successively produced samples; whereby said stored samples are compared to said reference samples and said stored samples are corrected in response to differences detected between said stored and reference samples and returned to said storage means, such that the corrected samples stored in said storage means gradually are changed to substantially equal said reference signals.

12. Apparatus for controlling the position of a rotary head in a video signal recording/reproducing device operable in an edit mode for first reproducing and then recording video signals on a record medium, said head being mounted on a deflection device and rotatably moved to scan successive tracks on said record medium, said apparatus comprising tracking drive signal generating means for generating data signals as a function of the configuration of the track relative to the scanning trace of said head; sampling means coupled to said tracking drive signal generating means for sampling the generated data signal to produce successive samples as said head scans past discrete locations along said track; a first memory having a respective storage compartment for each of said discrete locations to store a sample therein; selecting means for selecting a storage compartment from which a stored sample is read and into which a sample is written for storage; a second memory for storing reference samples representing a reference track configuration; comparator means for comparing a stored sample read from said first memory selectively to a produced sample or to a reference sample; correction means for correcting the stored sample read from said first memory when said stored sample differs from the produced or reference sample to which it is compared; means for returning the corrected sample to a selected storage compartment of said first memory; first switch means for coupling said generated data signals to said deflection device when said recording/reproducing device operates in said edit mode to reproduce video signals, and for coupling said stored samples from said first memory to said deflection device when said recording/reproducing device operates in said edit mode to record video signals and second switch means for coupling said produced samples to said comparator means when said recording/reproducing device operates in said edit mode to reproduce video signals, and for coupling said reference samples from said second memory to said comparator means when said recording/reproducing device operates in said edit mode to record video signals; whereby said stored samples represent the configuration of the track scanned by said head during reproducing and said stored samples represent the configuration of a reference track scanned by said head during recording.

13. The apparatus of claim 12 wherein said correction means comprises means for changing said stored sample by a predetermined amount irrespective of the actual difference between said stored sample and the produced or reference sample to which it is compared.

14. The apparatus of claim 13 wherein said stored sample is a digital signal and said predetermined amount is equal to ±1 bit.

15. The apparatus of claim 13 wherein said selected storage compartment of said first memory to which the corrected sample is returned is the same storage compartment from which the stored sample is read; whereby the configuration of the track represented by said stored samples gradually changes to represent said reference track during recording when said recording/reproducing device is changed over from reproducing to recording.

16. Apparatus for generating reference data representing the configuration of previously recorded reference tracks on a record medium, which tracks are scanned by a rotary head of a recording and/or reproducing device, said apparatus comprising a deflection device on which said head is mounted; tracking drive signal generating means for generating data signals representing the configuration of a previously recorded reference track relative to a trace scanned by said head; means for supplying said generated data signals to said deflection device to deflect the latter; a memory for storing data signals; read/write means for reading stored data signals from said memory and for writing data signals into said memory; comparator means for comparing said generated data signals to data signals read from said memory; correction means for correcting the stored data signals read from said memory when said stored data signals differ from said generated data signals, the stored data signals being corrected by a predetermined amount irrespective of the magnitude of the difference between said stored and generated data signals; and means for returning the corrected data signals to said memory; whereby the stored data signals gradually are corrected to represent the configuration of said previously recorded reference tracks as scanned by said rotary head.

17. The apparatus of claim 16 wherein said memory is comprised of plural storage compartments for storing samples; and said comparator means includes sampling means for sampling said generated data signals to produce successive generated samples such that said comparator means compares respective generated samples to stored samples read successively from said plural storage compartments.

18. The apparatus of claim 17 wherein said correction means comprises arithmetic means for modifying a sample read from a storage compartment by said predetermined amount if the compared samples differ from each other.

19. The apparatus of claim 16 further including an additional memory; and means for selectively supplying the data signals stored in the first-mentioned memory to said additional memory after a plurality of reference tracks have been scanned, whereby said additional memory stores reference data signals representing the configuration of said reference tracks.

20. The apparatus of claim 19 wherein said means for supplying said generated data signals to said deflection device comprises switch means having a first state to supply said generated data signals and a second state to supply reference data signals to said deflection device; and further comprising read-out means coupled to said additional memory to apply said reference data signals stored in said additional memory to said switch means when said recording and/or reproducing device operates to record tracks on said record medium.

21. The apparatus of claim 20 further comprising comparator switch means coupled to said comparator means and having first and second states for applying said generated data signals and said reference data signals, respectively, to said comparator means to be compared to said data signals read from said memory, said comparator switch means exhibiting said first state when said recording and/or reproducing device operates in an edit mode to reproduce tracks on said record medium and then, when an edit point is reached, said comparator switch means exhibits said second state when said recording and/or reproducing device records tracks on said record medium; and further including means for supplying the data signals read from said memory to said deflection device when said recording and/or reproducing device operates in said edit mode.

22. A method for controlling the position of a rotary head mounted on a deflection device as said head scans successive tracks on a record medium, comprising the steps of generating tracking drive signals representing the configuration of a track scanned by said head; comparing said generated tracking drive signal to a stored tracking drive signal to detect a difference therebetween; selectively correcting the stored tracking drive signal by a predetermined amount irrespective of the actual difference between the generated and stored tracking drive signals to produce a corrected tracking drive signal; storing said corrected tracking drive signal; and selectively supplying said generated tracking drive signals or the stored, corrected tracking drive signals to said deflection device for deflecting said head.

23. The method of claim 22 further comprising the steps of reproducing signals from previously recorded tracks on said record medium; and transferring said stored, corrected tracking drive signals to a reference storage device after a plurality of tracks have been scanned by said head to store reference data representing the configuration of said previously recorded tracks.

24. The method of claim 22, further comprising the steps of providing reference data representing the configuration of reference tracks; operating said head to record tracks on said record medium; and supplying said reference data to said deflection device when said head operates to record tracks on said record medium.

25. The method of claim 24, further comprising the steps of comparing said reference data to said stored tracking drive signal when said head operates to record tracks on said record medium; correcting said stored tracking drive signal by said predetermined amount if said stored tracking drive signal differs from said reference data; and storing the corrected tracking drive signal; whereby the stored tracking drive signal is changed gradually to conform to said reference data.

26. The method of claim 22, further comprising the steps of providing reference data representing the configuration of reference tracks; operating said head in an edit mode to reproduce previously recorded tracks on said record medium and to change over at an edit point to record tracks thereon; supplying the stored, corrected tracking drive signals to said deflection device when said head operates in said edit mode; comparing said generated tracking drive signal to said stored tracking drive signal when said head reproduces said previously recorded tracks; comparing said reference data to said stored tracking drive signal when said head records tracks; correcting said stored tracking drive signal in accordance with either of said comparisons; and storing the corrected tracking drive signal.

* * * * *